United States Patent
Gu et al.

(10) Patent No.: US 7,929,472 B2
(45) Date of Patent: Apr. 19, 2011

(54) METHOD AND APPARATUS FOR UPLINK SCHEDULING IN A MOBILE COMMUNICATION SYSTEM

(75) Inventors: Young Mo Gu, Suwon-si (KR); Min-Goo Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 900 days.

(21) Appl. No.: 11/837,334

(22) Filed: Aug. 10, 2007

(65) Prior Publication Data

US 2008/0037413 A1 Feb. 14, 2008

(30) Foreign Application Priority Data

Aug. 11, 2006 (KR) .................. 10-2006-0076116

(51) Int. Cl.
*H04B 7/00* (2006.01)
(52) U.S. Cl. ...................................... 370/310
(58) Field of Classification Search .......... None
See application file for complete search history.

(56) References Cited

U.S. PATENT DOCUMENTS

| | | | |
|---|---|---|---|
| 7,545,732 B2 | 6/2009 | Oh et al. | |
| 2004/0198369 A1 | 10/2004 | Kwak et al. | |
| 2004/0246998 A1 * | 12/2004 | Ma et al. | 370/527 |
| 2005/0135308 A1 * | 6/2005 | Vijayan et al. | 370/330 |
| 2005/0237989 A1 | 10/2005 | Ahn et al. | |
| 2006/0018347 A1 * | 1/2006 | Agrawal | 370/537 |
| 2006/0280116 A1 * | 12/2006 | Ji et al. | 370/210 |
| 2007/0127359 A1 * | 6/2007 | Ahn et al. | 370/208 |
| 2008/0025254 A1 * | 1/2008 | Love et al. | 370/329 |
| 2009/0323596 A1 * | 12/2009 | Wigren et al. | 370/329 |

FOREIGN PATENT DOCUMENTS

| | | |
|---|---|---|
| KR | 1020040050985 | 6/2004 |
| KR | 1020040063074 | 7/2004 |
| KR | 1020050020457 | 3/2005 |
| KR | 1020050102434 | 10/2005 |

* cited by examiner

*Primary Examiner* — Chi H Pham
*Assistant Examiner* — Fan Ng
(74) *Attorney, Agent, or Firm* — The Farrell Law Firm, P.C.

(57) ABSTRACT

A method and an apparatus for improving power efficiency of a User Equipment (UE) by using channel state information between a Node B and the UE and power headroom information of the UE in a mobile communication system. The method includes acquiring power information in relation to transmission powers of UEs; arranging the UEs in a sequence based on the power information; determining, for each UE according to the arranged sequence, whether a first reception power of a Node B exceeds a second reception power; allocating a resource area including partially consecutive sub-carriers to at least one corresponding UE when the first reception power exceeds the second reception power; allocating a resource area including entirely consecutive sub-carriers to at least one corresponding UE when the first reception power does not exceed the second reception power; and transmitting resource allocation information indicating the allocated resource area to the each UE.

16 Claims, 11 Drawing Sheets

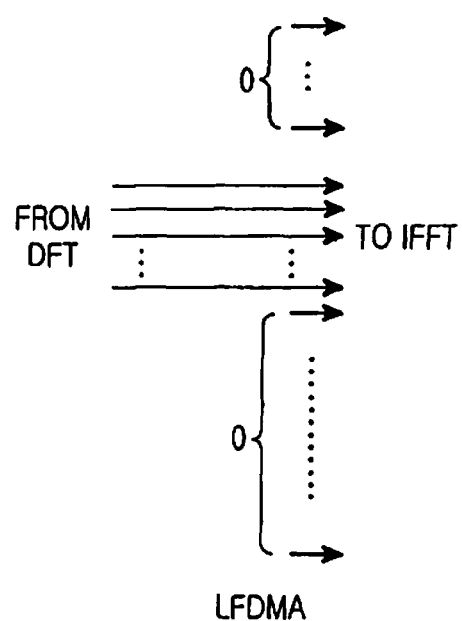
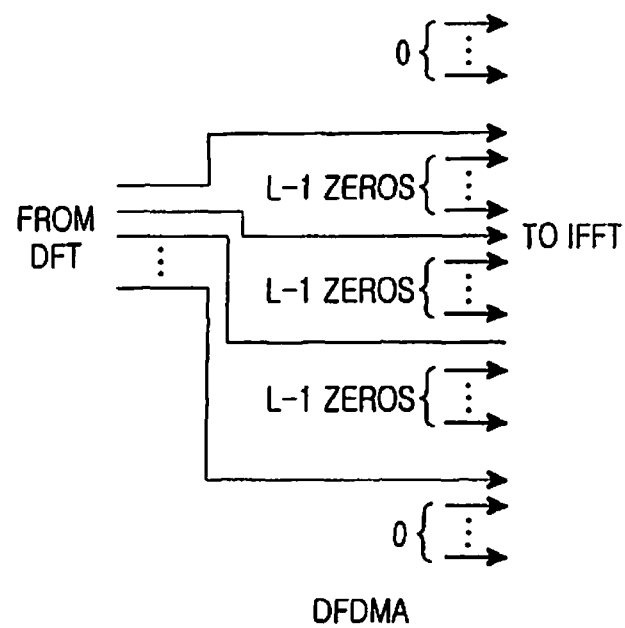
FIG.3A
(PRIOR ART)
FIG.3B
(PRIOR ART)

METHOD AND APPARATUS FOR UPLINK SCHEDULING IN A MOBILE COMMUNICATION SYSTEM

PRIORITY

This application claims priority under 35 U.S.C. §119(a) to an application filed in the Korean Industrial Property Office on Aug. 11, 2006 and assigned Serial No. 2006-76116, the contents of which are hereby incorporated by reference.

BACKGROUND OF THE INVENTION

1. Field of the Invention

The present invention generally relates to a mobile communication system, and more particularly to a method and an apparatus for efficient scheduling of an uplink in a mobile communication system for communication using a plurality of sub-carriers.

2. Description of the Related Art

Orthogonal Frequency Division Multiple Access (OFDMA), which is attracting attention as next generation mobile communication multiplexing technology, has been adopted in the standards of Institute of Electrical Electronics Engineers (IEEE) 802.16, IEEE 802.20, etc. However, according to Orthogonal Frequency Division Multiplexing (OFDM), which is modulation/demodulation technology of OFDMA, because a power amplifier has a high Peak-to-Average Power Ratio (PAPR), an increase in input back-off of the power amplifier is necessary in order to prevent non-linear distortion of a signal. Then, a maximum transmit power is inevitably similarly limited. Therefore, OFDMA has a low power efficiency.

When employing OFDMA as downlink multiplexing technology, there is no big problem because the transmitter is located in a Node B having no limitation in power. However, when employing OFDMA as uplink multiplexing technology, the transmitter is located in a User Equipment (UE) having a relatively large limitation in power. Therefore, a maximum power of the UE is limited, and the Node B coverage is similarly reduced. Therefore, in Long Term Evolution (LTE), which is $4^{th}$ Generation (4G) mobile communication technology of the $3^{rd}$ Generation Partnership Project (3GPP) standard, a Single Carrier FDMA (SC-FDMA) is being discussed as uplink multiplexing technology.

FIG. 1 shows a typical SC-FDMA transmitter. In FIG. 1, an $N_{TX}$ number of encoded and modulated symbols 102 is converted to frequency domain signals by a Discrete Fourier Transform (DFT) block 110. Then, the frequency domain signals are mapped to allocated sub-carriers by a sub-carrier mapper 120, and are then converted to a time domain signal by an Inverse Fast Fourier Transform (IFFT) block 130 having a size of $N_{FFT}$. Then, a Cyclic Prefix (CP) inserter 140 inserts a CP for eliminating inter-symbol interference into the time domain signal, thereby outputting an OFDM symbol. Then, the OFDM symbol is loaded onto a Radio Frequency (RF) signal by an RF unit (not shown) including a transmission filter and a power amplifier, and is then transmitted by the RF signal.

The SC-FDMA transmitter in FIG. 1 is different from an OFDMA transmitter in that the SC-FDMA transmitter additionally includes a DFT block 110, so a final output signal of the SC-FDMA transmitter is not a frequency domain signal, but is a time domain signal. Therefore, the signal input to the DFT block 110 of FIG. 1 has the same PAPR as that of the signal output from the IFFT block 130.

FIG. 2 is a graph illustrating a comparison between PAPRs of a Quadrature Phase Shift Keying (QPSK)-modulated SC-FDMA signal and an OFDMA signal when $N_{FFT}$=1024 and $N_{TX}$=256. The graph shows curves of Pr indicating a probability that an estimated PAPR might be larger than an initial value $PAPR_0$ of the PAPR ($PAPR > PAPR_0$). As noted from the graph, when Pr is 0.01, that is, when Pr ($PAPR > PAPR_0$) =0.01, the SC-FDMA signal has a gain of at least about 3 decibels (dB) in view of the PAPR in comparison with the OFDMA signal. Therefore, the SC-FDMA signal can have a higher power efficiency than the OFDMA signal.

As described above, the SC-FDMA signal has a lower PAPR than that of the OFDMA signal, and thus has a gain of at least about 3 dB in view of the power efficiency in comparison with the OFDMA signal. However, in order to make the PAPR of the DFT input and the PAPR of the IFFT output be identical with each other, the sub-carrier mapping inevitably has a limitation. FIGS. 3A and 3B illustrate a sub-carrier mapping according to SC-FDMA.

That is, in order to obtain a gain in the power efficiency, mapping of all of the $N_{TX}$-DFT output symbols to consecutive sub-carriers is necessary, as shown in FIG. 3A, or inserting an (L−1) number of 0 (null or zero) symbols between allocated sub-carriers is necessary, as shown in FIG. 3B. The sub-carrier mapping shown in FIG. 3A is called Localized FDMA (LFDMA), and the sub-carrier mapping shown in FIG. 3B is called Distributed FDMA (DFDMA).

An SC-FDMA may cause waste of resources in an uplink scheduling by a Node B due to the SC-FDMA having the limitation in the sub-carrier mapping as described above. Therefore, a need exists for technology capable of efficiently allocating at least one sub-carrier to each UE through uplink scheduling in an SC-FDMA system.

SUMMARY OF THE INVENTION

Accordingly, the present invention substantially solves the above-mentioned problems occurring in the prior art, and provides a method and an apparatus for overcoming the scheduling limitation of an SC-FDMA system, that is, the problem of allocation of consecutive sub-carriers to each user in the SC-FDMA system.

The present invention also provides a method and an apparatus for allocating partially consecutive sub-carriers to each user in an SC-FDMA system.

The present invention also provides a method and an apparatus for allocating partially consecutive sub-carriers to each user in consideration of channel state information of each sub-carrier of an uplink and power headroom information of a UE in an SC-FDMA system.

In accordance with an aspect of the present invention, there is provided a method for uplink scheduling in a mobile communication system performing communication using a plurality of sub-carriers, the method including transmitting scheduling-related information including power information in relation to a transmission power of a UE to a Node B; receiving resource allocation information indicating a resource area including entirely consecutive sub-carriers or a resource area including partially consecutive sub-carriers from the Node B according to the scheduling-related information; and performing a Fourier Transform on a transmission information symbol stream by at least one Fourier Transform block based on the resource allocation information, loading the Fourier Transformed transmission information symbol stream on sub-carriers indicated by the resource allocation information, and then transmitting the loaded transmission information symbol stream to the Node B.

In accordance with another aspect of the present invention, there is provided a method for uplink scheduling in a mobile communication system performing communication using a plurality of sub-carriers, the method including acquiring power information in relation to transmission powers of UEs; arranging the UEs in a sequence from a UE having a smallest power headroom to a UE having a largest power headroom based on the power information; determining, for each UE according to the arranged sequence, whether a first reception power of a Node B corresponding to a case of allocating partially consecutive sub-carriers exceeds a second reception power of the Node B corresponding to a case of allocating entirely consecutive sub-carriers; allocating a resource area including partially consecutive sub-carriers to at least one corresponding UE when the first reception power exceeds the second reception power; allocating a resource area including entirely consecutive sub-carriers to at least one corresponding UE when the first reception power does not exceed the second reception power; and transmitting resource allocation information indicating the allocated resource area to the each UE.

In accordance with another aspect of the present invention, there is provided an apparatus for signal transmission based on uplink scheduling in a mobile communication system performing communication using a plurality of sub-carriers, the apparatus including a controller for receiving resource allocation information indicating a resource area including entirely consecutive sub-carriers or a resource area including partially consecutive sub-carriers from a Node B according to scheduling-related information including power information in relation to a transmission power of a UE; and a transmitter for performing a Fourier Transform on a transmission information symbol stream by at least one Fourier Transform block based on the resource allocation information, loading the Fourier Transformed transmission information symbol stream on sub-carriers of a resource area indicated by the resource allocation information, and then transmitting the loaded transmission information symbol stream to the Node B.

In accordance with another aspect of the present invention, there is provided an apparatus for uplink scheduling in a mobile communication system performing communication using a plurality of sub-carriers, the apparatus including a scheduler for arranging UEs in a sequence from a UE having a smallest power headroom to a UE having a largest power headroom based on power headroom information in relation to transmission powers of the UEs, allocating, for each UE according to the arranged sequence, a resource area including partially consecutive sub-carriers to at least one corresponding UE when a first reception power of a Node B corresponding to a case of allocating partially consecutive sub-carriers exceeds a second reception power of the Node B corresponding to a case of allocating entirely consecutive sub-carriers, while allocating a resource area including entirely consecutive sub-carriers to at least one corresponding UE when the first reception power does not exceed the second reception power, and transmitting resource allocation information indicating the allocated resource area to the each UE.

BRIEF DESCRIPTION OF THE DRAWINGS

The above and other aspects, features and advantages of the present invention will be more apparent from the following detailed description taken in conjunction with the accompanying drawings, in which:

FIGS. 3A and 3B illustrate a sub-carrier mapping according to the SC-FDMA;

DETAILED DESCRIPTION OF THE PREFERRED EMBODIMENTS

Figure 1:
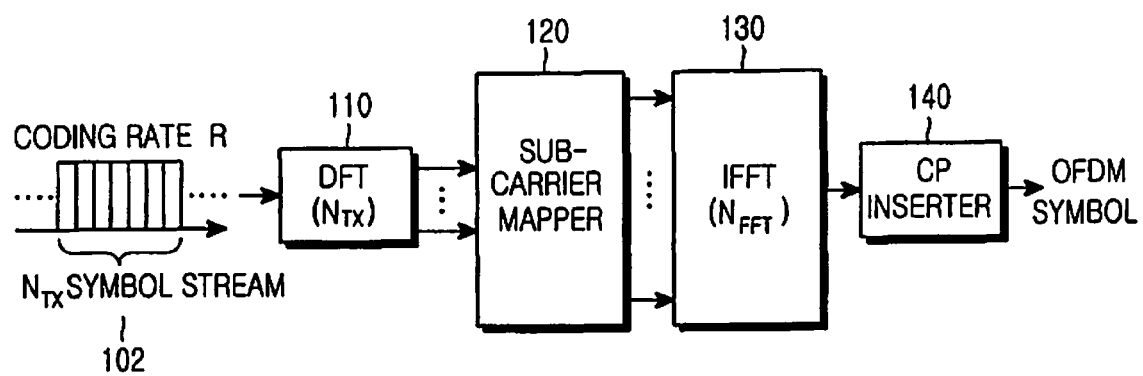
FIG. 1 is a block diagram of a typical SC-FDMA.
Figure 2:
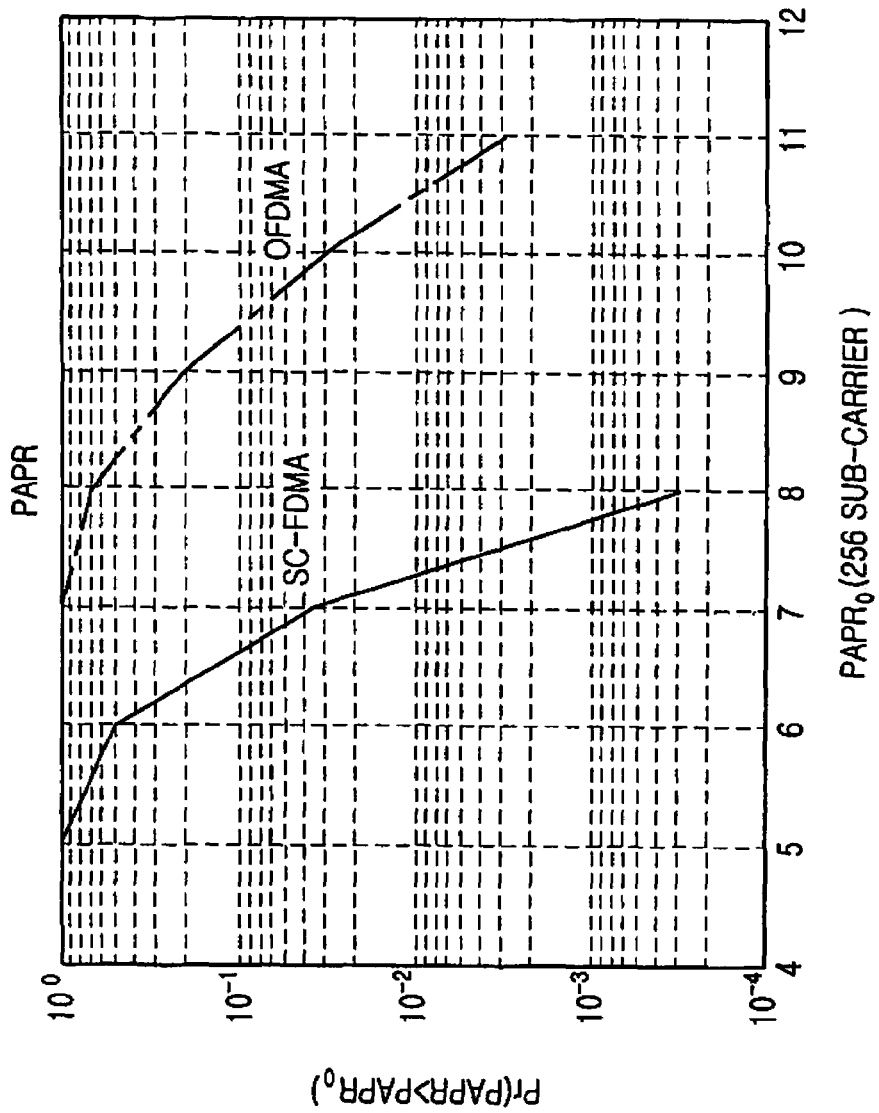
FIG. 2 is a graph illustrating a comparison between PAPRs of SC-FDMA and OFDMA.

Preferred embodiments of the present invention will now be described with reference to the accompanying drawings. In the following description, descriptions of known functions and configurations incorporated herein will be omitted when they may make the subject matter of the present invention rather unclear. Further, various specific definitions found in the following description are provided only to help general understanding of the present invention, and it is apparent to those skilled in the art that the present invention can be implemented without such definitions.

A main idea of the present invention described below is to allocate at least partially consecutive sub-carriers to each User Equipment (UE) in consideration of power headroom information and bandwidth information of the UE, uplink channel state information, etc., in allocating sub-carriers to each UE through uplink scheduling in a mobile communication system performing communication using a plurality of sub-carriers.

In the following description of the present invention, a Single Carrier Frequency Division Multiple Access (SC-FDMA) system applied to an uplink of a $3^{rd}$ Generation Partnership Project (3GPP) Long Term Evolution (LTE) system is discussed as an example. However, the technology of allocating at least partially consecutive sub-carriers according to the present invention can be also applied to other mobile communication systems having similar technical background and resource types with slight modification without departing from the scope of the present invention, as is apparent to one skilled in the art.

A UE, as used herein, is assumed to be small-sized, has a limitation in a size of a battery thereof, and thus also has a limitation in uplink transmission power because a UE capable of accessing a mobile communication system is typically a terminal carried by a user. However, the UE may be configured in various manners as desired. In an uplink communication, because coverage of a Node B is determined by transmission power of a UE, an SC-FDMA having a good power efficiency can have a Node B coverage larger than that of Orthogonal Frequency Division Multiple Access (OFDMA).

In general, one Node B can be connected to a plurality of UEs, which include UEs located far from the Node B and UEs located near the Node B. Therefore, in allocating resource areas for data transmission, the Node B first allocates sub-carriers, which are as consecutive as possible, to a first UE, which is located far from the Node B and thus has a limitation in the transmission power, so the first UE can transmit data by using the SC-FDMA. In contrast, the Node B allocates partially consecutive sub-carriers to a second UE, which is located near the Node B and thus has no limitation in the transmission power. Then, in the second UE, the transmission signal has a large Peak-to-Average Power Ratio (PAPR), and an increase the input back off value of the power amplifier is needed. However, the second UE has no limitation in the transmission power and thus has no problem.

Therefore, according to the present invention, consecutive sub-carriers are allocated to a UE having a big limitation in transmission power and partially consecutive sub-carriers are allocated to a UE not having a big limitation in transmission power. A location of a UE, channel status, or the like, may be used to determine whether the UE has a big limitation in transmission power and needs high transmission power to transmit data. For example, a UE may have a big limitation when the UE has a power headroom of a specific value which is less than a particular threshold value. Such a case as described above may occur, for example, when resource areas are re-allocated to UEs.

Figure 4:
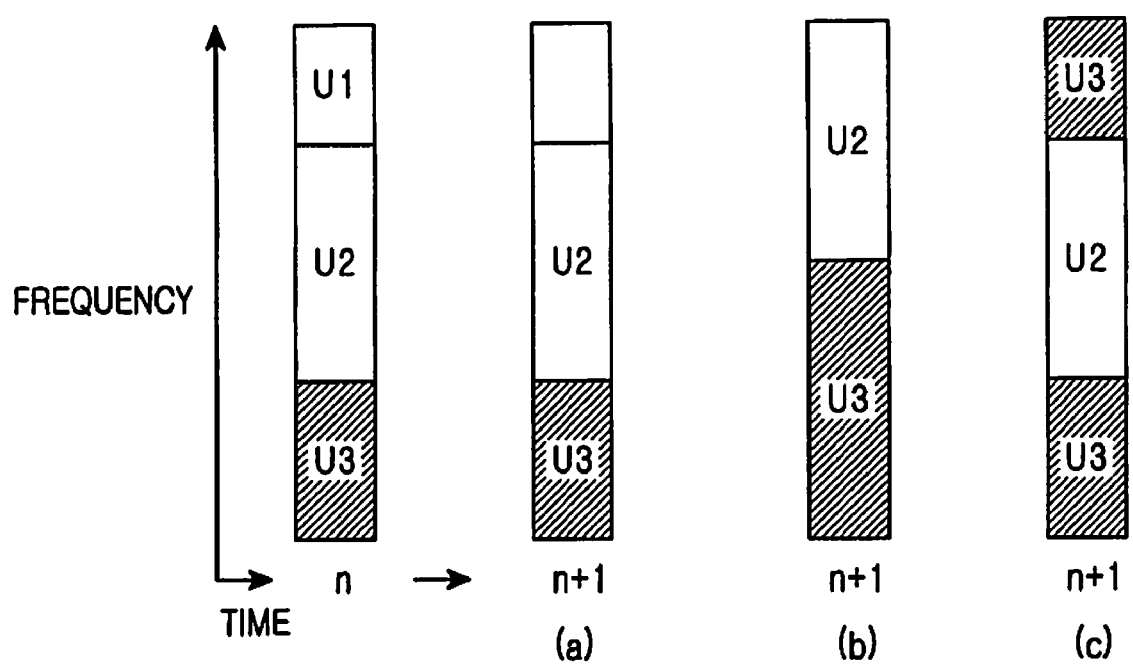
FIGS. 4A to 4C are views for illustrating re-allocation of resource areas in an SC-FDMA according to the present invention.

FIGS. 4A to 4C show re-allocation of resource areas in an SC-FDMA according to the present invention.

FIG. 4A illustrates a change from a frame n at which the entire uplink bands are allocated to users U1, U2, and U3 to a frame n+1 at which the resource allocation to the user U1 is released. When the released resource area of the user U1 is to be additionally allocated to the user U3, the resource area is allocated, as shown in FIG. 4B or FIG. 4C, according to whether the user U3 has a big limitation in transmission power.

Specifically, the Node B changes a resource location of the user U2 when the user U3 has a big limitation in transmission power, as shown in FIG. 4B, and then reallocates the resource area so the resource area of the user U1 is consecutively located after the original resource area of the user U3. At this time, not only the resource area of the user U3, but also the resource area of the user U1, is changed, to generate additional signaling overhead for signaling of resource areas of an uplink allocated to each user. Usually, resource allocation information indicating the resource areas of an uplink allocated to each user is broadcast to all users through a downlink control channel. Therefore, in FIG. 4B, additional signaling overhead is generated, and the scheduling of the Node B becomes relatively complicated.

In contrast, the Node B additionally allocates the released resource area of the user U1 without change to the user U3 when the user U3 does not have a big limitation in transmission power, as shown in FIG. 4C, thereby minimizing additional signaling overhead. Then, the resource area of the user U3 is arranged in a partially consecutive manner. At this time, the UE of the user U3 adjusts the back-off value of the power amplifier by a value according to a property of the resource area, that is, the full consecutiveness or the partial consecutiveness. The back-off value refers to a value used for limiting the input power of the power amplifier to a value smaller than a maximum input point of the power amplifier in order to guarantee linearity of the power amplifier. For example, when the maximum input point of the power amplifier is 26 dBm and the back-off value is 3 dB, the input power of the power amplifier is limited to a maximum of 23 dBm. Therefore, when the back-off value is increased, the transmission power usable by the UE is decreased.

In another example, allocating a partially consecutive resource area according to the channel state between a Node B and a UE may be more effective.

Figure 5A:
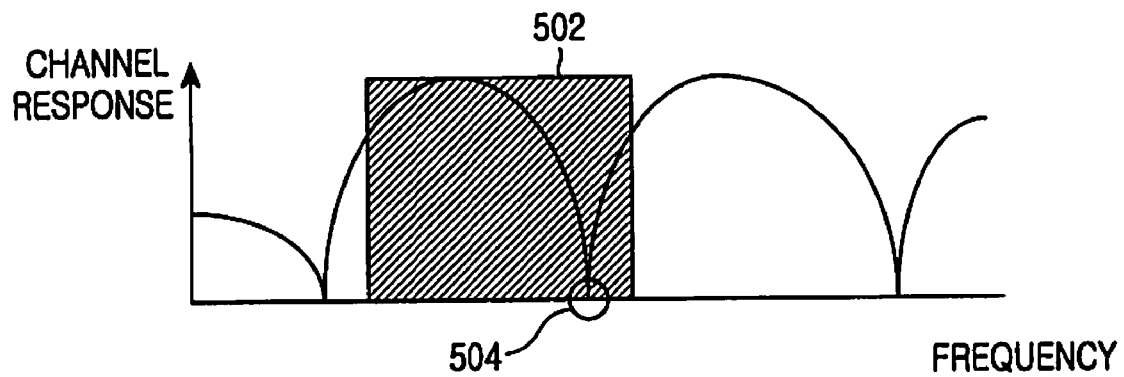
FIGS. 5A and 5B are graphs illustrating allocation of resource areas in consideration of a channel state between a Node B and a UE according to the present invention.
Figure 5B:
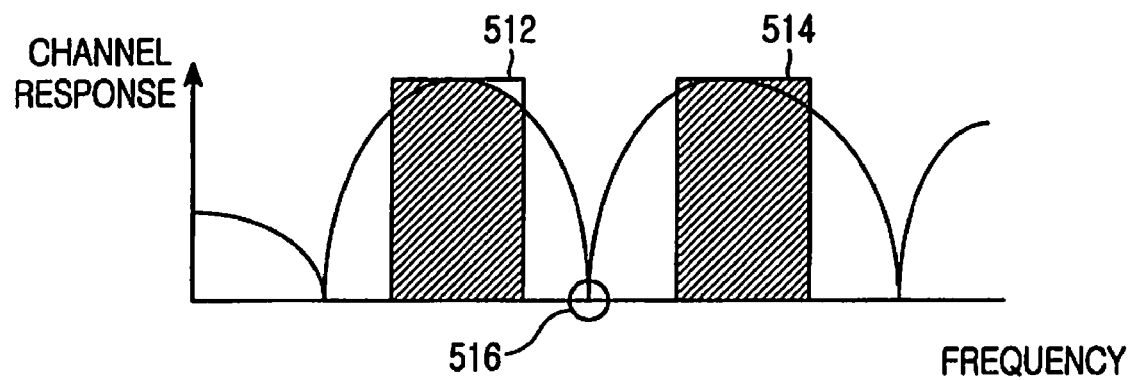

FIGS. 5A and 5B are graphs illustrating allocation of resource areas in consideration of a channel state between a Node B and a UE according to the present invention. In FIGS. 5A and 5B, the horizontal axis corresponds to a frequency axis and the vertical axis corresponds to a size of a channel response indicating the channel state between the Node B and the UE.

When a resource area 502 including consecutive sub-carriers according to a bandwidth (marked by hatching) is allocated to the UE when the channel response between the Node B and the UE is not flat in the entire frequency domain, as shown in FIG. 5A, the allocated resource area 502 inevitably includes a null 504 indicating a frequency area in which the size of the channel response is remarkably reduced. Then, data transmitted through the null 504 has a very large Bit Error Rate (BER), thereby degrading the entire data throughput.

Therefore, according to the present invention, one resource area 512 and 514 including partially consecutive sub-carriers avoiding the null 516 is allocated to one UE, as shown in FIG. 5B. That is to say, the Node B allocates the entirely consecutive resource area 502, as shown in FIG. 5A, to a UE having a big limitation in the transmission power, and allocates the partially consecutive resource area 512 and 514 to a UE having no big limitation in the transmission power according to the channel response characteristic of the corresponding UE, as shown in FIG. 5B. From among the partially consecutive resource area 512 and 514, the two sets 512 and 514 each including consecutive sub-carriers are referred to below as resource blocks, respectively.

In order for a Node B to perform scheduling according to whether a UE has a limited transmission power, power headroom information of the UE is necessary. Basically, in order to perform an uplink Adaptive Modulation Coding (AMC) operation, a UE periodically reports power headroom information indicating a power state of the UE to a Node B. According to the present invention, such power headroom information is used in the scheduling of the Node B. Power headroom information, as used herein, indicates a difference between a maximum transmission power of a UE and a transmission power used at a time of reporting the power headroom information to a Node B. For example, when the maximum transmission power is 23 dBm and the transmission power used at the time of reporting the power headroom information to the Node B is 10 dBm, the power headroom information can indicate 13 dBm. The maximum transmission power is determined by the back-off value and the power amplifier performance (i.e. maximum input point) of the UE.

Figure 6:
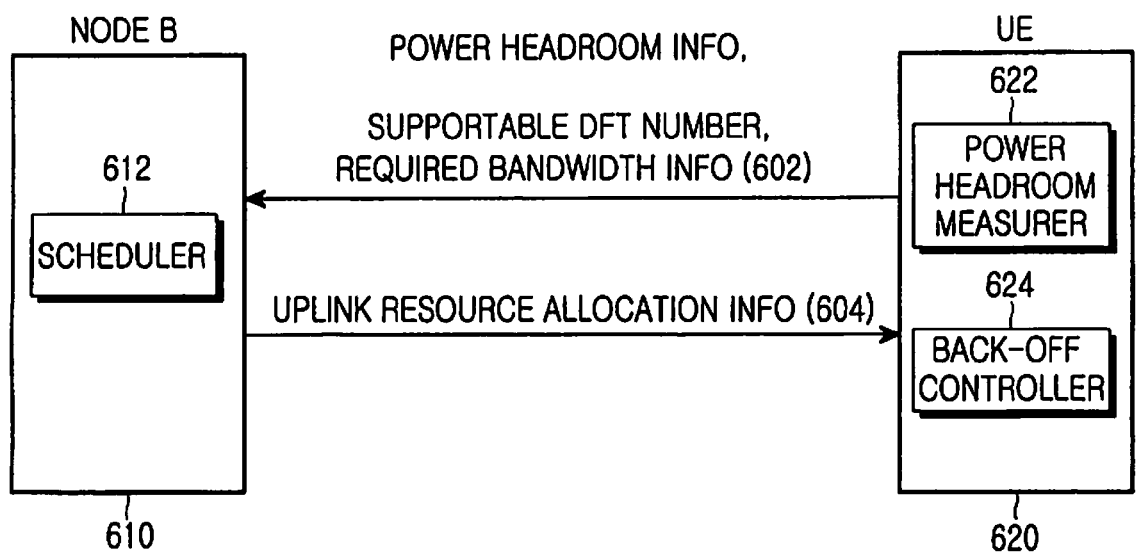
FIG. 6 illustrates a construction of and signaling between a Node B and a UE for efficient uplink scheduling according to the present invention.

FIG. 6 shows signaling between a Node B and a UE for efficient uplink scheduling according to the present invention. As illustrated, the Node B 610 includes a scheduler 612, and the UE 620 includes a power headroom measurer 622 and a back-off controller 624.

In FIG. 6, the UE 620 periodically or non-periodically transmits scheduling-related information, including power headroom information for transmission power of the UE, the number of supportable Discrete Fourier Transforms (DFTs), the bandwidth information, etc., to the Node B 610. According to another example of the present invention, the number of supportable DFTs and the bandwidth information may be known to the Node B in advance. Then, the scheduling-related information 602 includes only the power headroom information.

By using the scheduling-related information 602, scheduling-related information provided by other UEs connected to the Node B 610, and uplink channel state information measured for all of the UEs, the Node B 610 determines sub-carriers of the allocated resource area so the sub-carriers within the resource area allocated to the UE 620 are arranged in an entirely or partially consecutive manner according to whether the UE 620 has limited transmission power, and then transmits uplink resource allocation information 604 indicating the sub-carriers within the allocated resource area to the UE 620 through a downlink control channel. The uplink resource allocation information 604 may indicate the resource areas allocated to all the UEs connected to the Node B 610.

Based on the attributes of the allocated resource area, when the allocated resource area is partially consecutive, the UE 620 increases the input back-off value of the power amplifier by a value $P_B$. Thereafter, the UE transmits uplink data through the allocated resource area.

Figure 7:
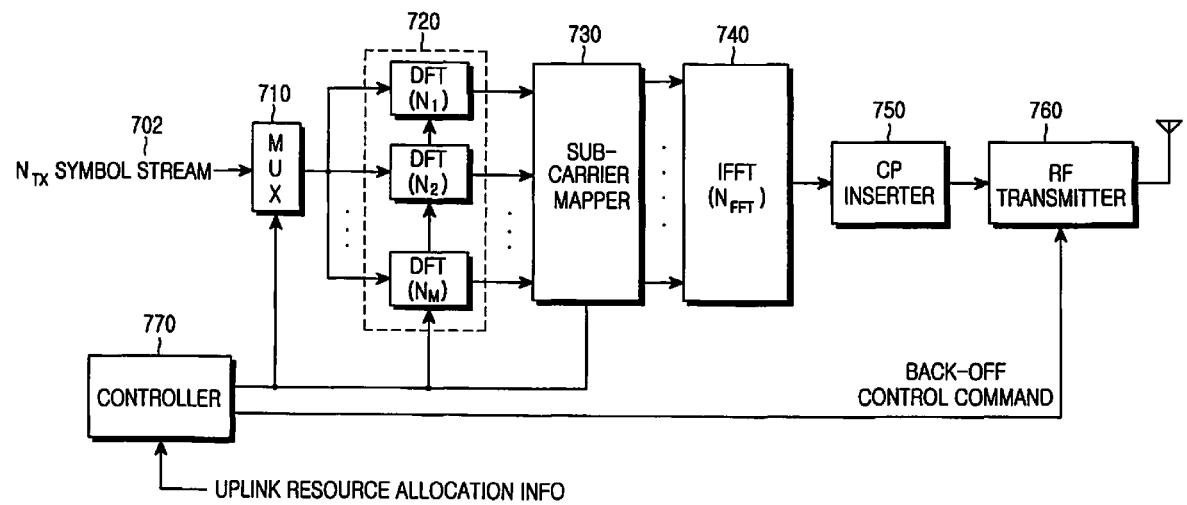
FIG. 7 is a block diagram of an SC-FDMA transmitter according to the present invention, which can allocate partially consecutive sub-carriers.

FIG. 7 shows an SC-FDMA transmitter according to the present invention, which can allocate partially consecutive sub-carriers. The illustrated transmitter is mounted in a UE, and includes a DFT unit 720 including M number of DFT blocks, which have DFT sizes of $N_1, N_2, \ldots, N_M$, respectively, in order to support resource blocks constituting the partially consecutive resource area. The SC-FDMA transmitter in FIG. 7 also includes a multiplexer (MUX) 710, a sub-carrier mapper 730, an Inverse Fast Fourier Transform (IFFT) block 740, a Cyclic Prefix (CP) inserter 750, a Radio Frequency (RF) transmitter 760, a controller 770, and an antenna. A description on elements for transmitting scheduling-related information is omitted.

In FIG. 7, $N_{TX}$ number of encoded and modulated information symbols 702 are input to the MUX 710. The MUX 710 distributes the input $N_{TX}$ symbols 702 to M number of DFT blocks. Then, a relation of $N_{TX}=N_1+N_2+\ldots+N_M$ is established. Based on uplink resource allocation information received from a Node B, the controller 770 determines the number of DFT blocks to be used from among the M DFT blocks and a DFT size of each DFT block to be used, thereby controlling the MUX 710 and the DFT unit 720.

Since use of too many DFT blocks increases the complexity of the UE, the UE may report the number of supportable DFT blocks to the Node B through scheduling-related information, and the Node B may apply the reported information to the scheduling. Otherwise, the UE may report the number of supportable DFT blocks to the Node B at the time of call setup, or the Node B may be aware of the number of DFT blocks supportable by the UE in advance.

An operation of the UE when the partially consecutive resource area has been allocated by the Node B will now be described.

The DFT unit 720 converts the input symbols distributed by the MUX 710 into frequency domain signals by using the DFT blocks corresponding to resource blocks of the partially consecutive resource area, respectively. In other words, the number of used DFT blocks is the same as the number of resource blocks constituting the allocated resource areas. As already described above, each of the resource blocks includes consecutive sub-carriers, and sub-carriers belonging to different resource blocks are not consecutive to each other. The frequency domain signals are mapped to sub-carriers of corresponding resource blocks by a sub-carrier mapper 730, and are then converted to a time domain signal by an IFFT block 740 having a size of $N_{FFT}$. To this end, the controller 770 reports sub-carriers of the resource blocks corresponding to each of the used DFT blocks to the sub-carrier mapper 730.

The CP inserter 750 inserts a CP into the time domain signal, thereby outputting an OFDM symbol. Then, the OFDM symbol is loaded on an RF signal and is then transmitted to the Node B by an RF transmitter 760 including a transmission filter (not shown) and a power amplifier (not shown). In the RF transmitter 760, before the signal is input to the power amplifier, the signal is subjected to a pre-processing so the input signal is within a back off input range of the power amplifier. The input back off value of the power amplifier is set to be a larger value than that when an entirely consecutive resource area has been allocated to the UE, and is determined based on a back off control command provided from the controller 770.

Figure 8:
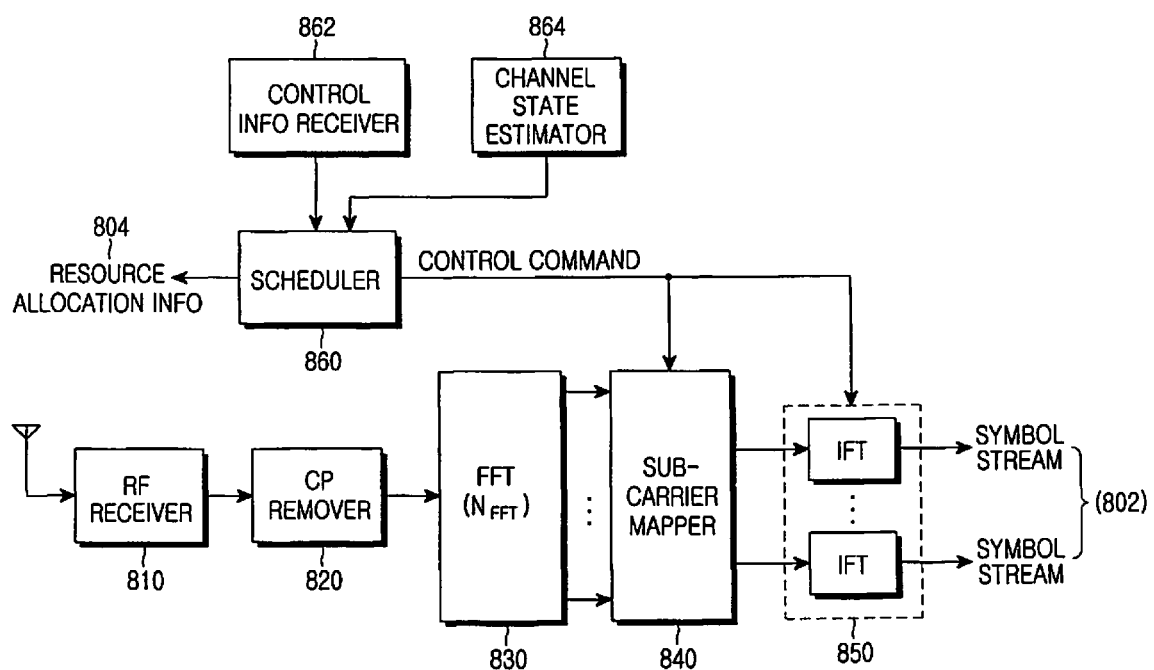
FIG. 8 is a block diagram of an SC-FDMA receiver according to the present invention, which can map partially consecutive sub-carriers.

FIG. 8 shows an SC-FDMA receiver according to the present invention, which can map partially consecutive sub-carriers. The illustrated receiver is mounted in a Node B, and includes a scheduler 860 for allocating resource areas, which are entirely or partially consecutive according to whether the power of the UE is limited to the UE. The SC-FDMA receiver of FIG. 8 also includes an RF receiver 810, a CP remover 820, a Fast Fourier Transform (FFT) block 830, a sub-carrier mapper 840, an Inverse Fourier Transform (IFT) unit 850, a control information receiver 862, and a channel state estimator 864.

In FIG. 8, the RF receiver 810 receives an RF signal received through a system bandwidth including an $N_{FFT}$ number of sub-carriers, and the CP remover 820 removes a CP from an OFDM symbol section of the RF signal, thereby providing the CP-removed OFDM signal to the FFT block 830 having a size of $N_{FFT}$. The FFT block 830 converts the OFDM signal transmitted from the CP remover 820 into frequency domain signals including $N_{FFT}$ number of sub-carriers.

In the meantime, by referring to scheduling-related information of UEs provided from the control information receiver 862, which includes power headroom information, the number of supportable DFTs, and bandwidth information, and by taking uplink channel state information of the UEs estimated by a channel state estimator 864 into consideration, the scheduler 860 allocates resource areas, which include entirely or partially consecutive sub-carriers, to the UEs, and transmits uplink resource allocation information indicating the allocated resource areas to the UEs through a downlink control channel. Also, the scheduler 860 reports sub-carriers belonging to the resource areas allocated to each of the UEs to the sub-carrier mapper 840.

The sub-carrier mapper 840, under the control of the scheduler 860, transmits the sub-carriers of the frequency domain signals to IFT blocks of the IFT unit 850 based on each of the consecutively allocated resource blocks. At this time, according to whether the resource areas allocated to each UE are entirely consecutive or partially consecutive, one or more IFT blocks are allocated to each UE. In other words, the number of IFT blocks allocated to each UE is the same as the number of resource blocks constituting the resource areas allocated to each UE.

The IFT blocks of the IFT unit 850 convert the frequency domain signals transmitted from the sub-carrier mapper 840 into time domain signals, which become encoded and modulated information symbol streams 802. The information symbol streams 802 are combined for each corresponding allocated UE and are then output for demodulation and decoding. For example, if two resource blocks have been allocated to a particular UE, the signals of the two resource blocks are independently IFTed by two IFT blocks of the IFT unit 850 and are then combined together into one information symbol stream, which is then output.

Figure 9:
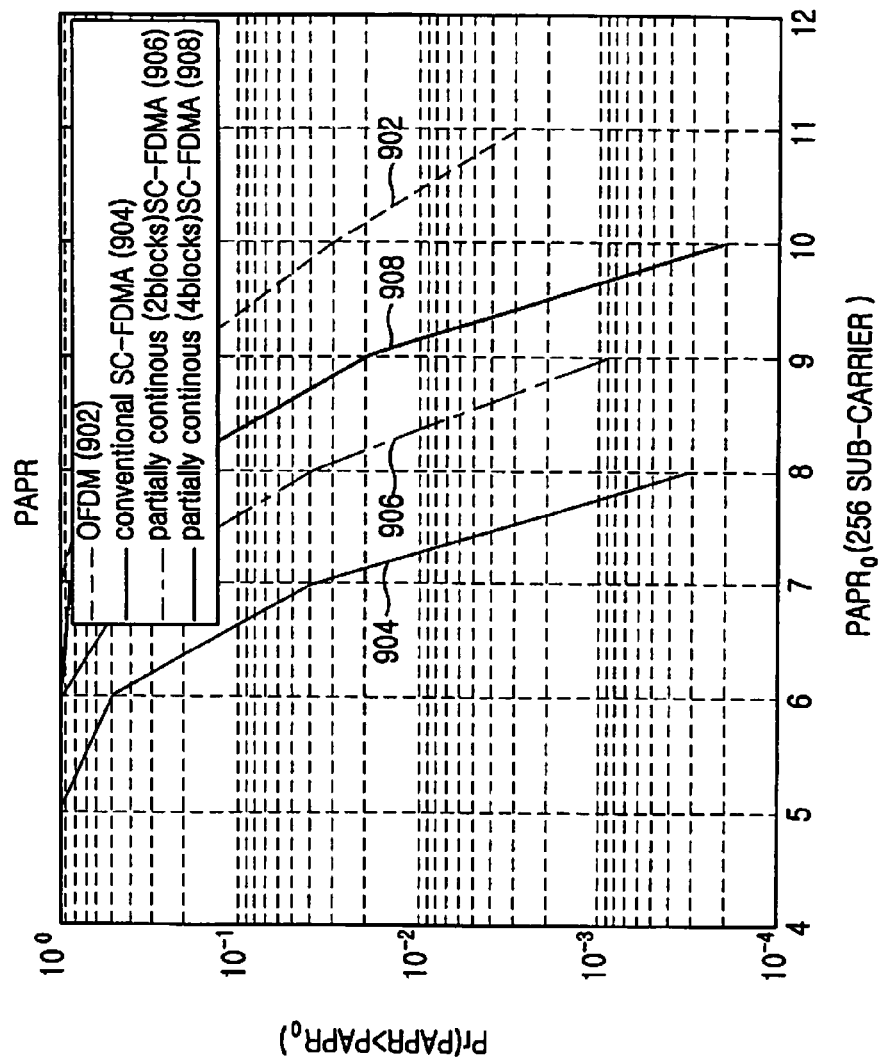
FIG. 9 is a graph illustrating PAPRs of an SC-FDMA signal using mapping of partially consecutive sub-carriers according to the present invention.

FIG. 9 is a graph illustrating comparison between a PAPR of an SC-FDMA signal mapped to QPSK-modulated and partially consecutive sub-carriers and a PAPR of an SC-FDMA signal mapped to entirely consecutive sub-carriers when $N_{FFT}=1024$ and $N_{TX}=256$. The graph shows curves of Pr indicating a probability that an estimated PAPR might be larger than an initial value $PAPR_0$ of the PAPR ($PAPR>PAPR_0$). Specifically, the graph shows a comparison between a first curve 906 when the number of DFTs supportable by a UE is 2 and the size of each DFT is 128 and a second curve 908 when the number of DFTs supportable by a UE is 4 and the size of each DFT is 64. As noted, in comparison with the third curve 904 corresponding to the conventional SC-FDMA signal, the first curve shows an increase of about 1 dB in PAPR and the second curve 908 shows an increase of about 2 dB.

Therefore, the SC-FDMA scheme according to the present invention has a PAPR performance, which is somewhat inferior to the third curve 904 corresponding to the conventional SC-FDMA signal but is superior to the fourth curve 902 corresponding to the conventional OFDMA signal, and overcomes the problems mentioned above with reference to FIGS. 4B and 5A.

In the SC-FDMA scheme, transmission signals of multiple UEs must simultaneously reach a Node B receiver. Therefore, a UE periodically transmits a ranging signal, and the Node B calculates the time difference between the Node B and the UE by using the ranging signal and then feeds back the time difference to the UE, to acquire uplink timing synchronization between the Node B and the UE. The time difference between the Node B and the UE is proportional to the distance between the Node B and the UE. Further, as the distance between the Node B and the UE increases, the transmission power limitation of the UE increases. Therefore, according to another example of the present invention, information indicating the time difference may be used for the scheduling instead of the power headroom information of the UE.

The power headroom information reported by the UE indicates the power limitation of the UE more directly than the information of the distance between the Node B and the UE does. Therefore, according to another example of the present invention, the information of the time difference between the Node B and the UE is used instead of the power headroom information in the scheduling, when a UE enters a coverage of a Node B and measures the time difference between the Node B and the UE in order to acquire timing synchronization between the Node B and the UE. Thereafter, the power headroom information reported by the UE in the scheduling can be used when the Node B cannot measure the time difference between the Node B and the UE after the UE acquires the uplink timing synchronization by using the downlink timing information.

Figure 10:
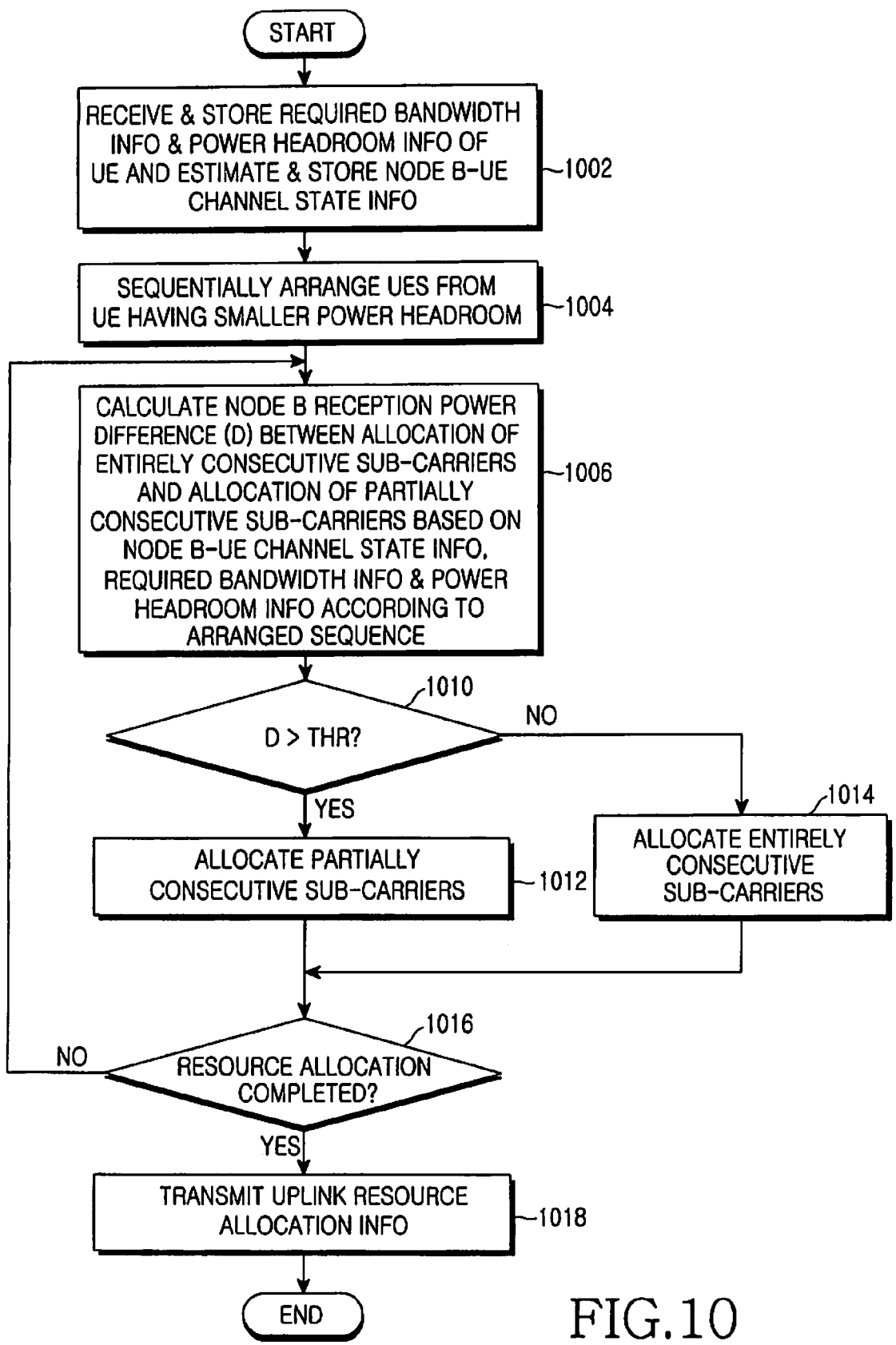
FIG. 10 is a flow diagram illustrating a scheduling operation of a Node B using power headroom information of a UE according to the present invention.

FIG. 10 shows a scheduling operation of a Node B using power headroom information of a UE according to the present invention. In FIG. 10, in step 1002, the Node B receives and stores bandwidth information and power headroom information of corresponding UEs from the UEs connected in advance to the Node B, and estimates channel state information indicating the channel states between the Node B and the UEs. Then, in step 1004, the Node B arranges the UEs in a sequence from a UE having the smallest power headroom to a UE having the largest power headroom based on the power headroom information of the UEs to be scheduled. The reason for the arrangement as described above is in order to first allocate more consecutive sub-carriers to a UE having a smaller power headroom.

In step 1006, the Node B estimates, sequentially from the UE having the smaller power headroom, a Node B reception power D1 when partially consecutive sub-carriers have been allocated and a Node B reception power D2 when entirely consecutive sub-carriers have been allocated, by using the bandwidth information, the channel state information, and the power headroom information, and then calculates the difference between the Node B reception powers (D=D1−D2).

In step 1010, the Node B compares the power difference with a threshold value THR. When the power difference is larger than the threshold value THR, the Node B allocates at least partially consecutive sub-carriers corresponding to a bandwidth requested by the UE to the UE in step 1012. When the power difference is not larger than the threshold value THR, the Node B allocates entirely consecutive sub-carriers corresponding to a bandwidth requested by the UE to the UE in step 1014. At this time, in step 1012, the Node B allocates entirely consecutive sub-carriers to the UE when entirely consecutive sub-carriers corresponding to a bandwidth requested by the UE are not being used. Likewise, the Node B allocates partially consecutive sub-carriers to the UE when it is impossible to use entirely consecutive sub-carriers corresponding to a bandwidth requested by the UE. Further, in step 1012 or 1014, the Node B first allocates, from among unused sub-carriers, sub-carriers by which a UE can achieve a good channel characteristic, for example, consecutive sub-carriers having a channel response above a reference, to the UE.

The threshold value THR used for the comparison in step 1010 may be determined as a value obtained by adding margins reflecting errors in calculation of the Node B reception power according to the estimation error for the channel state information between the Node B and the UE, an error in the power headroom information of the UE, and a power amplifier efficiency difference according to a PAPR change of a UE transmission signal, with respect to the case of allocating the partially consecutive sub-carriers and the case of allocating the entirely consecutive sub-carriers.

In step 1016, the Node B determines whether all UEs to be scheduled have been allocated sub-carriers except for the already allocated sub-carriers. When a UE to be scheduled is left, the process proceeds to step 1006 in order to allocate sub-carriers to the UE. In contrast, the process proceeds to step 1018 when all the UEs have been allocated sub-carriers of when there is no sub-carrier left to be allocated. In step 1018, the Node B generates uplink resource allocation information indicating the sub-carriers allocated to the UEs, and then transmits the generated uplink resource allocation information to the UEs through a downlink control channel.

Figure 11:
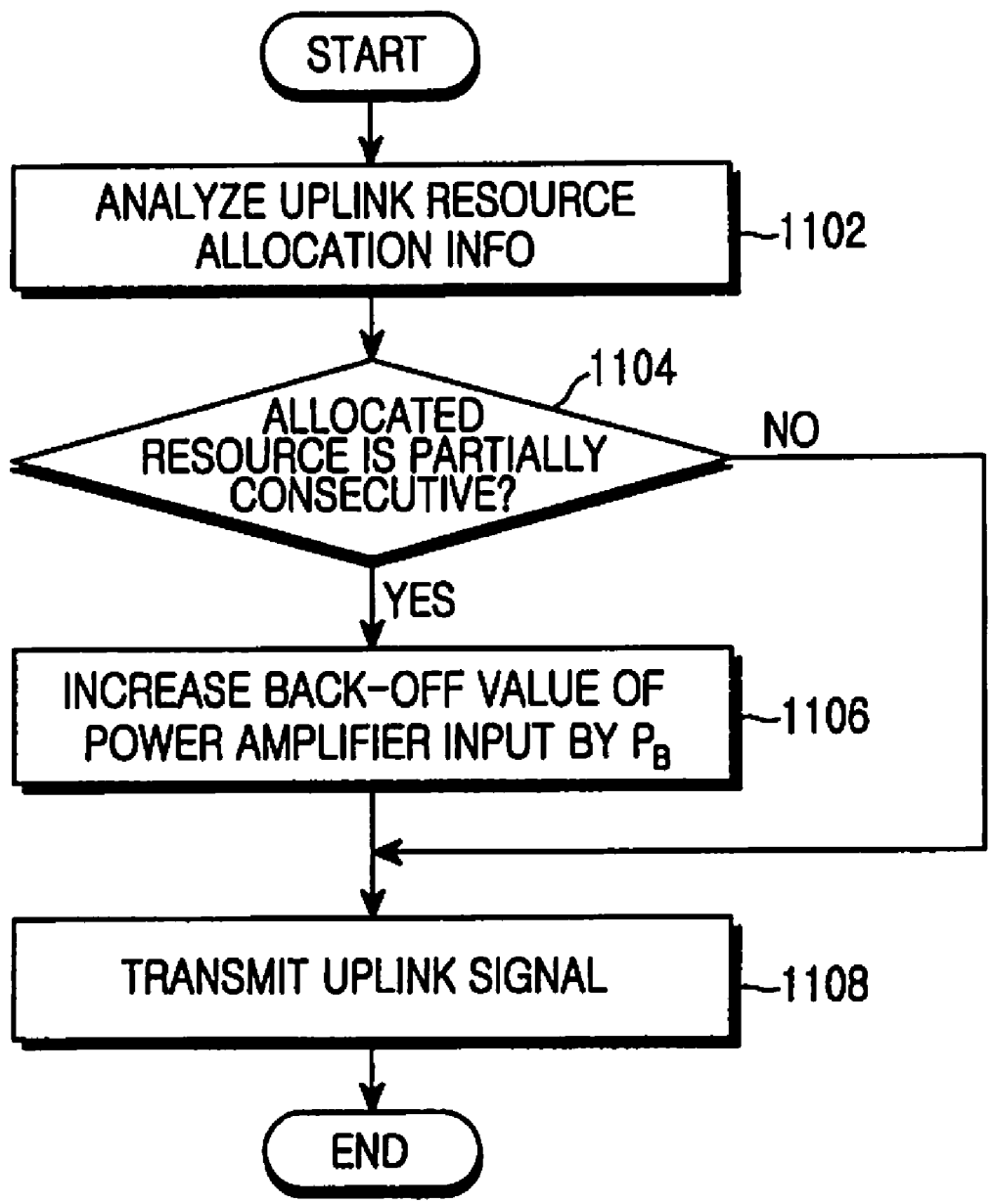
FIG. 11 is a flow diagram illustrating an operation of controlling the back off of a power amplifier in a UE based on uplink resource allocation according to the present invention.

FIG. 1 shows an operation of controlling the back off of a power amplifier in a UE based on uplink resource allocation according to the present invention. In FIG. 11, in step 1102, the UE receives uplink resource allocation information through a downlink control channel and analyzes (parses) the received information. In step 1104, the UE determines whether the uplink resource allocation information indicates that a resource area including partially consecutive sub-carriers has been allocated to the UE.

When a resource area including partially consecutive sub-carriers has not been allocated to the UE, that is, when a resource area including entirely consecutive sub-carriers has been allocated to the UE, the UE transmits an uplink signal through the construction shown in FIG. 7 by using a back off value as it is in step 1108. In contrast, when a resource area including partially consecutive sub-carriers has been allocated to the UE, the back off value to be input to the power amplifier of the UE is increased by a value $P_B$ from the back off value in step 1106, and an uplink signal from the UE is transmitted using the increased back off value in step 1108.

Effects of the present invention will now be briefly described.

According to the present invention, when a Node B performs uplink scheduling, the Node B obtains information of the distance between the Node B and the UE or power headroom information of the UE. Then, the Node B allocates an entirely consecutive resource area to a UE, which is located far from the Node B and thus has a limited transmission power, and allocates a partially consecutive resource area to a UE, which is located near the Node B and does not have a limited transmission power. Therefore, the present invention can reduce the complexity of the Node B scheduling and can effectively use the entire system band, thereby improving data throughput for each Node B.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for uplink scheduling in a mobile communication system performing communication using a plurality of sub-carriers, the method comprising the steps of:
    transmitting scheduling-related information including power information in relation to a transmission power of a User Equipment (UE) to a Node B;
    receiving resource allocation information indicating a resource area including entirely consecutive sub-carriers or a resource area including partially consecutive sub-carriers from the Node B according to the scheduling-related information; and
    performing a Fourier Transform on a transmission information symbol stream by at least one Fourier Transform block based on the resource allocation information, loading the Fourier Transformed transmission information symbol stream on sub-carriers indicated by the resource allocation information, and then transmitting the loaded transmission information symbol stream to the Node B,
    wherein the power information includes a power headroom information which indicates a difference between a maximum transmission power of the UE and a transmission power used at a time of reporting the power information to the Node B.

2. The method of claimed in claim 1, the partially consecutive sub-carriers are allocated to the UE when a value indicated by the power headroom information is larger than a threshold value.

3. The method as claimed in claim 1, further comprising:
    increasing a back off value to be used for power amplification of a radio signal including the transmission information symbol stream in the step of transmitting the loaded transmission information symbol stream by a value when the resource allocation information indicates a resource area including partially consecutive sub-carriers; and
    power-amplifying the radio signal by using the increased back off value.

4. The method as claimed in claim 1, wherein the scheduling-related information further comprises at least one of bandwidth information and a number of Fourier Transform blocks supportable by the UE.

5. A method for uplink scheduling in a mobile communication system performing communication using a plurality of sub-carriers, the method comprising the steps of:
    (1) acquiring power information in relation to transmission powers of User Equipments (UEs);
    (2) arranging the UEs in a sequence from a UE having a smallest power headroom to a UE having a largest power headroom based on the power information;
    (3) determining, for each UE according to the arranged sequence, whether a first reception power of a Node B corresponding to a case of allocating partially consecutive sub-carriers exceeds a second reception power of the Node B corresponding to a case of allocating entirely consecutive sub-carriers;
    (4) allocating a resource area including partially consecutive sub-carriers to at least one corresponding UE when the first reception power exceeds the second reception power;
    (5) allocating a resource area including entirely consecutive sub-carriers to at least one corresponding UE when the first reception power does not exceed the second reception power; and
    (6) transmitting resource allocation information indicating the allocated resource area to the each UE.

6. The method as claimed in claim 5, further comprising receiving scheduling-related information including at least one of the power information, bandwidth information, and a number of Fourier Transform blocks supportable by the UE.

7. The method as claimed in claim 5, wherein step (3) comprises:
    comparing a difference between the first reception power and the second reception power with a threshold value;
    concluding that the first reception power exceeds the second reception power when the difference exceeds the threshold value; and
    concluding that the first reception power does not exceed the second reception power when the difference does not exceed the threshold value.

8. The method as claimed in claim 5, wherein the power information is acquired from a time difference between the Node B and the UE, which is calculated by using a ranging signal transmitted from the UE.

9. An apparatus for signal transmission based on uplink scheduling in a mobile communication system performing communication using a plurality of sub-carriers, the apparatus comprising:
    a controller for receiving resource allocation information indicating a resource area including entirely consecutive sub-carriers or a resource area including partially consecutive sub-carriers from a Node B according to scheduling-related information including power information in relation to a transmission power of a User Equipment (UE); and
    a transmitter for performing a Fourier Transform on a transmission information symbol stream by at least one Fourier Transform block based on the resource allocation information, loading the Fourier Transformed transmission information symbol stream on sub-carriers of a resource area indicated by the resource allocation information, and then transmitting the loaded transmission information symbol stream to the Node B,
    wherein the power information includes a power headroom information which indicates a difference between a maximum transmission power of the UE and a transmission power used at a time of reporting the power information to the Node B.

10. The apparatus of claimed in claim 9, the partially consecutive sub-carriers are allocated to the UE when a value indicated by the power headroom information is larger than a threshold value.

11. The apparatus as claimed in claim 9, wherein the transmitter increases a back off value to be used for power amplification of a radio signal including the transmission information symbol stream in the step of transmitting the loaded transmission information symbol stream by a value, and then power-amplifies the radio signal by using the increased back off value when the resource allocation information indicates a resource area including partially consecutive sub-carriers.

12. The apparatus as claimed in claim 9, wherein the scheduling-related information comprises at least one of bandwidth information and a number of Fourier Transform blocks supportable by the UE.

13. An apparatus for uplink scheduling in a mobile communication system performing communication using a plurality of sub-carriers, the apparatus comprising:
  a scheduler for arranging User Equipments (UEs) in a sequence from a UE having a smallest power headroom to a UE having a largest power headroom based on power information in relation to transmission powers of the UEs, allocating, for each UE according to the arranged sequence, a resource area including partially consecutive sub-carriers to at least one corresponding UE when a first reception power of a Node B corresponding to a case of allocating partially consecutive sub-carriers exceeds a second reception power of the Node B corresponding to a case of allocating entirely consecutive sub-carriers, while allocating a resource area including entirely consecutive sub-carriers to at least one corresponding UE when the first reception power does not exceed the second reception power, and transmitting resource allocation information indicating the allocated resource area to the each UE; and
  a receiver for receiving scheduling-related information.

14. The apparatus as claimed in claim 13, wherein the scheduling-related information comprises at least one of the power information, bandwidth information, and a number of Fourier Transform blocks supportable by the UE.

15. The apparatus as claimed in claim 13, wherein the scheduler performs:
  comparing a difference between the first reception power and the second reception power with a threshold value;
  concluding that the first reception power exceeds the second reception power when the difference exceeds the threshold value; and
  concluding that the first reception power does not exceed the second reception power when the difference does not exceed the threshold value.

16. The apparatus as claimed in claim 13, wherein the power information is acquired from a time difference between the Node B and the UE, the time difference being calculated by using a ranging signal transmitted from the UE.

* * * * *